Nov. 5, 1968    J. JOSEPHSON    3,408,864
WAVE HEIGHT MEASURING SYSTEM
Filed Aug. 18, 1966    2 Sheets—Sheet 1
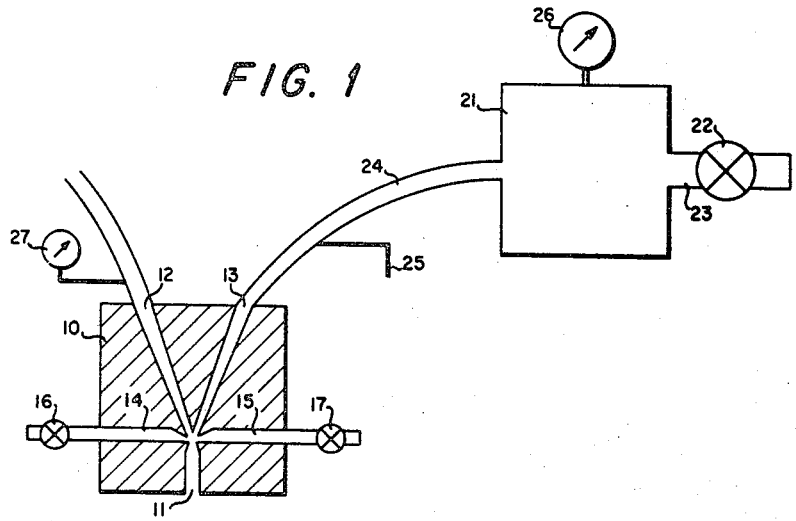
FIG. 1
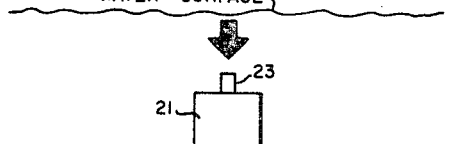
WATER SURFACE
FIG. 3
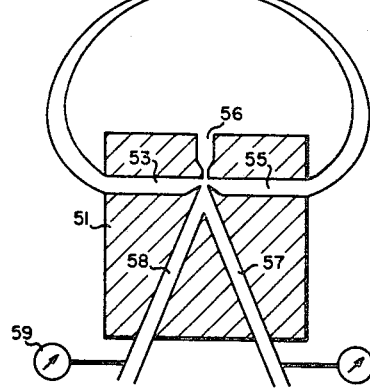
INVENTOR
JULIAN JOSEPHSON
BY *Melvin L. Crane* AGENT
*[signature]* ATTORNEY Nov. 5, 1968  J. JOSEPHSON  3,408,864
WAVE HEIGHT MEASURING SYSTEM
Filed Aug. 18, 1966  2 Sheets-Sheet 2
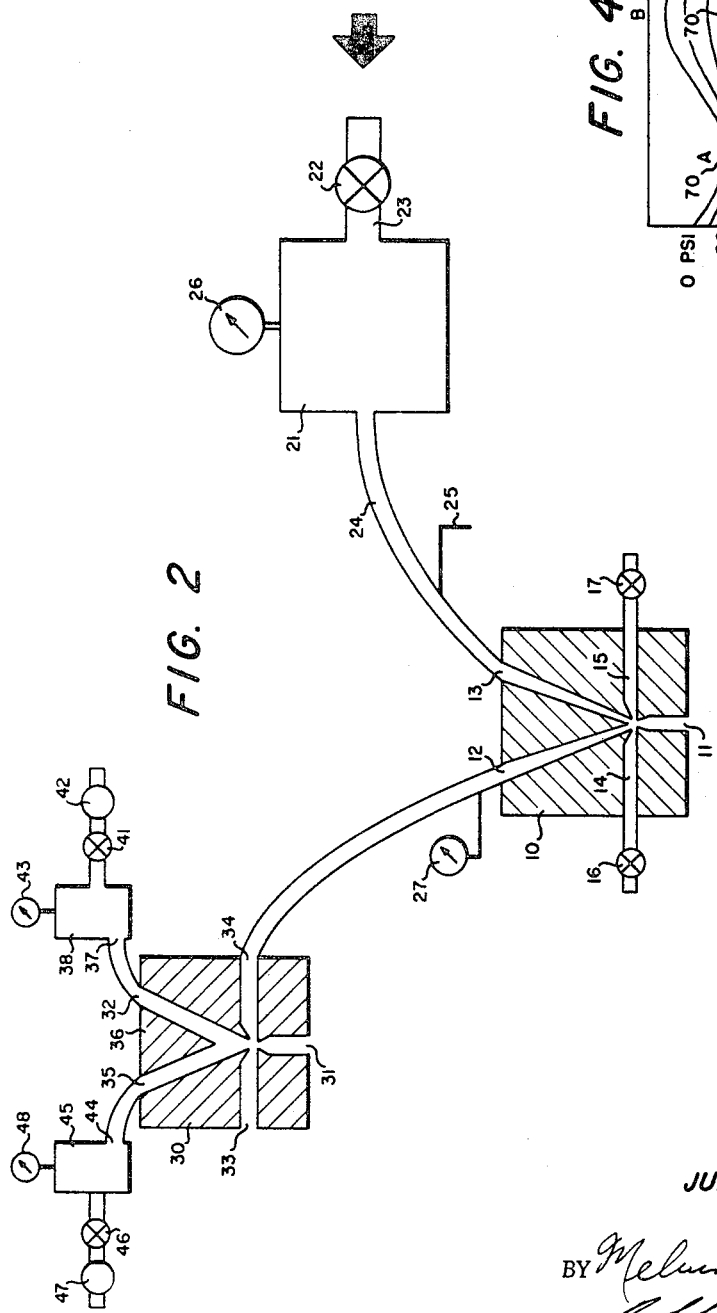
INVENTOR
*JULIAN JOSEPHSON*
BY *Melvin L. Crane* AGENT
ATTORNEY

United States Patent Office 3,408,864
Patented Nov. 5, 1968

3,408,864
WAVE HEIGHT MEASURING SYSTEM
Julian Josephson, 4814 Eastern Lane, Apt. 103,
Suitland, Md. 20023
Filed Aug. 18, 1966, Ser. No. 573,767
3 Claims. (Cl. 73—170)

ABSTRACT OF THE DISCLOSURE

This disclosure is directed to a wave measuring device constructed of pure-fluid logic components. The device includes a non-memory flip-flop fluid amplifier with one of two outputs suitably connected with a pressure tank. Wave pressure applied within the pressure tank operates to control the output of the fluid amplifier. A pressure indicator in the output side of the fluid amplifier indicates the wave height.

---

The invention described herein may be manufactured and used by or for the Government of the United States of America for governmental purposes without the payment of any royalties thereon or therefor.

The present invention relates to wave measuring devices and more particularly to an apparatus for measuring the height, length, and period of a wave without any movable parts.

A situation often presents itself where it becomes necessary or desirable to ascertain certain information regarding the height, geometry, and periodicity of waves generated upon the surface of a body of water. Heretofore, various types of mechanical, sound operated, and electron wave measuring devices have been constructed and used operationally to ascertain certain information regarding the height, geometry, and periodicity of waves generated from the surface of a body of water. Some such devices have proven to be accurate and reliable; however, such devices are very expensive requiring specific construction for protection of the equipment to avoid any contact with the surrounding water. Such devices must be constructed to keep water away from the various components which often involves heavy pressure-proofing and elaborate leak-proofing procedures.

It is well known in the art that pressure of water increases as depth increases. It has been determined that the pressure in the vertical plane under the trough of a wave is greater for a certain vertical distance than a corresponding distance under the crest of a wave such that the pressure lines follow somewhat a sine wave with corresponding pressure lines closer together under a trough than that under a crest. Thus, an element held at the same point under water will experience a greater pressure when under the crest of a wave than the pressure experienced when under a trough. Therefore, the same element will experience a pressure change between the trough and the crest of a wave in which the pressure change can be measured to determine the height and period of the wave.

It is therefore an object of the present invention to provide an inexpensive, efficient, reliable device for ascertaining certain information rgearding waves generated upon the surface of a body of water.

Still another object is to provide a device which is not subjected to damage by the surrounding water.

Yet another object is to provide a means which makes use of the oceanic environment in order to sense data of the wave condition.

Other objects and advantages of this invention will hereinafter become more fully apparent from the following description of the annexed drawings, in which:

FIG. 1 is a simple device made in accordance to the present invention for ascertaining wave information;

FIG. 2 illustrates a different arrangement including that as shown in FIG. 1;

FIG. 3 is a modification of the device shown in FIG. 2; and

FIG. 4 represents the position of the device relative to the surface of water in which the device is placed.

The wave measuring device of the present invention is constructed of pure-fluid logic components. The basic device includes a non-memory flip-flop fluid amplifier suitably connected with a pressure tank in which the pressure tank is connected to one of the outputs of the flip-flop. In a modification of the basic device a second flip-flop is connected to the output of the basic device and in which a pressure gage indicates the information regarding the geometry of the wave which is being measured.

Now referring to the drawings, there is shown by reference to FIG. 1 a wave information device made in accordance to the present invention. As shown, the device includes a non-memory flip-flop fluid amplifier 10 having an input 11 with outputs 12 and 13. The flip-flop amplifier device includes controls 14 and 15 each of which includes an adjustable valve 16 which may be controlled electronically or by any other method. A pressure tank 21 having a one way valve 22 in the inlet 23 thereof has an outlet 24 connected with outlet 13 of the flip-flop amplifier device. The outlet connection between the tank and the outlet 13 of the flip-flop device is provided with a bleeder 25, the purpose of which will be described later.

The pressure tank is provided with a pressure gage 26 and the outlet 12 of the flip-flop device is provided with a pressure gage 27 the purpose of which will be described later.

In operation of the device as shown in FIG. 1 the fluid input through nozzle 11 is controlled by control valves 16 and 17 such that the fluid through input 11 will be directed through output 13 toward the pressure tank. The tank flip-flop fluid amplifier device is placed in the water such that the upper portion of the tank which includes the one way inlet valve is positioned just under the water of the valley in a wave surface. The tank is maintained in a level such that, as a wave comes along, the wave will be over the tank for the entire height of the wave thereby applying a pressure in the tank through the one way valve. The pressure in the tank is then applied to the flip-flop amplifier through outlet 13 of flip-flop amplifier 10 thereby forcing the fluid through inlet 11 to emerge through output 12. As the fluid emerges through output 12 the pressure gage 27 indicates the pressure of the water output thereby indicating the height of the wave over the tank. The period of the wave is determined by the pressure indication on pressure gage 27 wherein after the wave passes over the tank the pressure of the tank is lowered thereby permitting the pressure input to the flip-flop to be directed toward output 13 and toward the tank. Thus, there will be no pressure indication on gage 27 at the output 12. In order to prevent the fluid in output 13 from actually entering the tank 21 and contaminating the signal after a wave passes over the tank the bleeder tube 25 is placed in the line to permit the fluid from output 13 to emerge from bleeder tube 25.

Now referring to FIG. 2 there is shown by illustration a clock fluid amplifier in which a biased flip-flop is connected to the output passage of the non-memory flip-flop fluid amplifier as shown in FIG. 1 so that the high energy output of the device of FIG. 1 can control the fluid input of the biased flip-flop. The biased flip-flop includes power inlet 31 which is biased to the right wall outlet 32 by the biased control passage 33. The control passage 34 is connected to the output 13 of the non-memeory flip-flop 10 in which the control passage 34 controls the output as will be described later to direct fluid entering power input 31 out through output 35 of the biased flip-flop. The splitter 36 is so constructed that the fluid through inlet 31 controlled by control 33 will be normally directed through output 32 provided there is no power supplied through control passage 34. As shown, output 32 is connected with the inlet 37 of a tank 38 which has a one way control valve 41 in the outlet of the tank. The outlet of the tank is directed to a flow gage 42 which measures the flow of the fluid through the outlet from the tank. A pressure gage 13 is provided to indicate the pressure in tank 38. Outlet 35 is connected with the inlet 44 of a tank 45 which is provided with a one way valve 46 for permitting passage of fluid from the tank outlet to a fluid gage 47. The tank 45 is provided with a pressure gage 48 for indicating the pressure within the tank 45.

In operation of the device as shown in FIG. 2 the operation of the non-memory flip-flop fluid amplifier set forth in FIG. 1 is the same as set forth above wherein output 12 is connected with the control passage 34 of the biased flip-flop. The biased flip-flop operates such that the fluid input through passage 31 is normally directed through passage 32 and into tank 38 and through flow gage 42. When a wave passes over tank 21 which creates a pressure in tank 21 to prevent an output through passage 13 and flip-flop 10, thereby forcing the fluid input out through passage 12 and into control passage 34 of the biased flip-flop. The pressure from output 12 applied through passage 34 overcomes the biased control of passage 33 such that the fluid input through 31 is directed through passage 35. The fluid from output 35 is directed into tank 45 and out through valve 46 through a flow meter 47. As long as sufficient force is applied to control passage 34 acting on the input fluid through passage 31 to direct the output through 35 the pressure gage 48 will indicate a pressure in accordance with the height of the wave. The pressure indication of gage 48 will persist so long as the wave pressure over tank 21 is sufficient that the output fluid of flip-flop 10 is sufficient to overcome the biased fluid input of the biased flip-flop. Thus, the period and the height of the wave is determined by the pressure of gage 48. Since the biased control 33 directs the fluid input through passage 31 of the biased flip-flop to be diverted through passage 32 into tank 38 thereby creating a pressure on pressure gage 43, the pressure gage 43 will indicate a pressure so long as there is no wave above tank 21. Therefore one can determine by the apparatus as shown in FIG. 2 the period of time that there is no wave above tank 21 and the period and height of the wave by pressure from pressure gage 48.

The control valves and pressure gages used with the device as set forth above may be of any suitable well known type which may be electrically controlled and wherein the output of the pressure gages will provide an electrical recording by use of a pen and ink, electrostatic type of chart, or any other particular recording device.

FIG. 3 is another modification of the device as shown in FIGS. 1 and 2. The device as shown in FIG. 3 includes a T-flip-flop fluid amplifier 50 in combination with a flip-flop 51. A pressure tank 21 is secured to the inlet of the T-flip-flop 50. The control passage outlet 52 of the flip-flop is connected with control passage 53 of the control flip-flop 51 whereas the outlet 54 is connected with control passage 55. The controlled flip-flop includes fluid inlet 56 and outlets 57 and 58 wherein outlet 58 is provided with a pressure gage indicator 59. A control valve 61 is placed in the outlet of the tank within the passage to the fluid inlet 62 of the T-flip-flop 50. The system as shown in FIG. 3 is so biased that when water is still and pressure in the tank 21 is below a certain level, control pressure in the controlled flip-flop through control passage 53 is such that any output from the controlled flip-flop will be through output 57. When a wave passes over the tank 21, pressure increases within the tank sufficiently to force open the valve 61 between the tank and the T-flip-flop such that flow in the controlled flip-flop is reversed with an intensity proportional to the pressure created by the wave height. Flow from the T-flip-flop is directed through output 54 to the control passage 55 which overcomes the flow into output 57 to direct the fluid input into passage 58. Thus, the pressure indicator 59 will indicate the pressure output through passage 58 whereby the pressure indication is proportional to the pressure created by the wave height. Pressure gage 59 will indicate a pressure so long as the wave passes over tank 21 wherein the period of the wave is also determined. Reduction of pressure over tank 21 will restore the system to its original condition whereby the fluid input control flip-flop 51 is directed by control passage 53 out through output 57.

Since the pressure of water at the same level from the bottom changes as wave height changes, the system set forth above determines the height and period of a wave by producing a fluid output in accordance to the pressure change. Since the system amplifies the pressure input, the system is ideal for detecting small changes of pressure and therefore will measure small waves as well as large waves. FIG. 4 illustrates a wave height measuring device 70 held in position by anchor 71 and line 72 relative to the pressure lines 73 shown by illustration in the drawing. As shown, the device under a trough A is in a different pressure zone than that under the crest B; therefor the pressure due to the wave will be greater for the higher waves and will be detected and measured by the device made in accordance to this invention.

Obviously many modifications and variations of the present invention are possible in the light of the above teachings. It is therefore to be understood that within the scope of the appended claims the invention may be practiced otherwise than as specifically described.

What is claimed and desired to be secured by Letters Patent of the United States is:

1. A system for determining the geometry of an ocean wave, which comprises:

a flip-flop fluid amplifier means, said flip-flop fluid amplifier means including an inlet, first and second control passages relative to said inlet and first and second outlet passages, a fluid container means, said fluid container means having a fluid inlet and a fluid outlet, said fluid outlet of said container connected with said first outlet passage of said fluid amplifier to permit flow of fluid from said fluid container to said fluid amplifier, in response to pressure change within said container due to wave motion relative to said fluid container, means for determining the pressure of fluid flow through said second output of said fluid amplifier means, whereby the wave geometry is determined from said determined pressure, and means to support said system in a fixed position below the surface of the wave to be measured.

2. A system as claimed in claim 1, wherein:

said first and second control passages include adjustable control means secured thereto for controlling fluid flow through said fluid amplifier inlet.

3. A system as claimed in claim 1, which includes:
a second flip-flop fluid amplifier,
said second flip-flop fluid amplifier comprising an inlet, first and second control passages, and first and second outlet passages,
a fluid line connection between said second outlet of said fluid amplifier means, and said first control passage of said second fluid amplifier, and
separate means secured relative to said first and second outlet means of said second fluid amplifier to determine fluid flow therethrough whereby the wave geometry is determined by said separate means.

References Cited

UNITED STATES PATENTS 2,766,622  10/1956  Johnson _____ 73—170 X

OTHER REFERENCES

Hobbs, E. V.: U.S. Army Materiel Command report "Fluid Amplification," paper No. 9, entitled Logic Elements, cataloged by ASTIA as AD No. 401,321, March 1963, pp. 5–8, 14, 19, 23 and 24.

RICHARD C. QUEISSER, *Primary Examiner.*

JERRY W. MYRACLE, *Assistant Examiner.*